US012012775B2

(12) United States Patent
Mani et al.

(10) Patent No.: US 12,012,775 B2
(45) **Date of Patent: *Jun. 18, 2024**

(54) ELECTRONIC LOCK WITH MOVABLE IN-LINE LOCKING LUG

(71) Applicant: Schlage Lock Company LLC, Carmel, IN (US)

(72) Inventors: Vijayakumar Mani, Bangalore (IN); Prem Ratan Mohan Ram, Bangalore (IN); Abdul Khadar Jailani Mannanayak, Bangalore (IN)

(73) Assignee: Schlage Lock Company LLC, Carmel, IN (US)

( * ) Notice: Subject to any disclaimer, the term of this patent is extended or adjusted under 35 U.S.C. 154(b) by 748 days.

This patent is subject to a terminal disclaimer.

(21) Appl. No.: 16/552,784

(22) Filed: Aug. 27, 2019

(65) Prior Publication Data

US 2020/0232254 A1 Jul. 23, 2020

Related U.S. Application Data

(63) Continuation of application No. 15/799,405, filed on Oct. 31, 2017, now Pat. No. 10,392,836, which is a (Continued)

(51) Int. Cl.
*E05B 47/00* (2006.01)
*E05B 47/06* (2006.01)

(52) U.S. Cl.
CPC ...... *E05B 47/0012* (2013.01); *E05B 47/0001* (2013.01); *E05B 47/0004* (2013.01); (Continued)

(58) Field of Classification Search
CPC .... E05B 13/10; E05B 13/101; E05B 47/0001; E05B 47/0002; E05B 47/0003; (Continued)

(56) References Cited

U.S. PATENT DOCUMENTS 5,018,375 A 5/1991 Tully
5,083,122 A 1/1992 Clark
(Continued)

FOREIGN PATENT DOCUMENTS

EP 1122385 A1 8/2001
EP 2142729 B1 8/2011
EP 2492034 A1 4/2012

OTHER PUBLICATIONS

Mexican Office Action; Mexican Patent Office; Mexican Patent Application No. MX/a/2016/011075; dated Oct. 29, 2019; 6 pages.
(Continued)

*Primary Examiner* — Christopher J Boswell
(74) *Attorney, Agent, or Firm* — Taft Stettinius & Hollister LLP

(57) ABSTRACT

A lock assembly is disclosed to lock a moveable structure to a fixed structure. The lock assembly includes an electric actuator operable to move a locking lug between first and second axial positions to correspond with a locked and unlocked configuration of the lock assembly. A resilient member can couple the locking lug to the electric actuator and drive the locking lug between the first and second positions.

24 Claims, 7 Drawing Sheets

Related U.S. Application Data continuation of application No. 15/156,703, filed on May 17, 2016, now Pat. No. 9,834,959, which is a continuation of application No. 14/188,891, filed on Feb. 25, 2014, now Pat. No. 9,340,998.

(52) U.S. Cl.
CPC ...... *E05B 47/0005* (2013.01); *E05B 47/0603* (2013.01); *E05B 47/0642* (2013.01); *E05B 47/068* (2013.01); *E05B 2047/0031* (2013.01); *E05B 2047/0036* (2013.01); *E05B 2047/0048* (2013.01); *E05B 2047/0084* (2013.01); *E05B 2047/0094* (2013.01); *Y10T 29/49826* (2015.01); *Y10T 70/7062* (2015.04); *Y10T 70/7068* (2015.04)

(58) Field of Classification Search
CPC ............. E05B 47/0004; E05B 47/0005; E05B 47/0012; E05B 47/0603; E05B 47/0607; E05B 47/0638; E05B 47/0642; E05B 47/0657; E05B 47/0661; E05B 47/0676; E05B 47/068; E05B 2047/00; E05B 2047/0001; E05B 2047/0012; E05B 2047/0031; E05B 2047/0036; E05B 2047/0048; E05B 2047/0084; E05B 2047/0094
See application file for complete search history.

(56) References Cited

U.S. PATENT DOCUMENTS

| | | | | |
|---|---|---|---|---|
| 5,421,178 | A | 6/1995 | Hamel et al. | |
| 5,628,216 | A | 5/1997 | Qureshi et al. | |
| 5,694,798 | A | 12/1997 | Nunez et al. | |
| 5,782,118 | A | 7/1998 | Chamberlain et al. | |
| 5,794,472 | A | 8/1998 | Kester et al. | |
| 6,038,896 | A | 3/2000 | Chamberlain et al. | |
| 6,953,210 | B2 | 10/2005 | Lemettinen | |
| 7,003,993 | B1 | 2/2006 | Zehrung | |
| 7,918,114 | B2 | 4/2011 | Walsh, III | |
| 8,302,438 | B2 | 11/2012 | Lui | |
| 8,356,499 | B2 | 1/2013 | Peng | |
| 8,366,160 | B2 | 2/2013 | Orbeta et al. | |
| 8,375,753 | B2 | 2/2013 | Goldman | |
| 9,181,730 | B1 * | 11/2015 | Peng | E05B 47/0001 |
| 9,340,998 | B2 | 5/2016 | Mani et al. | |
| 9,834,959 | B2 | 12/2017 | Mani et al. | |
| 10,392,836 | B2 * | 8/2019 | Mani | E05B 47/068 |
| 10,465,423 | B2 * | 11/2019 | Wong | E05B 47/0657 |
| 10,920,455 | B2 * | 2/2021 | Wong | E05B 47/0012 |
| 2009/0025438 | A1 | 1/2009 | Don et al. | |
| 2010/0122561 | A1 * | 5/2010 | Lui | E05B 47/0673 70/277 |
| 2010/0133856 | A1 | 6/2010 | Helisten | |
| 2010/0242555 | A1 | 9/2010 | Frolov et al. | |
| 2012/0006082 | A1 | 1/2012 | Peng | |
| 2012/0198897 | A1 | 8/2012 | Lui | |
| 2013/0192316 | A1 | 8/2013 | McKibben et al. | |
| 2013/0227996 | A1 | 9/2013 | McKibben et al. | |

OTHER PUBLICATIONS

Extended European Search Report; European Patent Office; European Patent Application No. 15754880.1; dated Oct. 20, 2017; 7 pages.
International Search Report and Written Opinion; International Searching Authority; International PCT Application No. PCT/US15/17507; dated Jun. 16, 2015; 7 pages.
Canadian Office Action; Canadian Intellectual Property Office; Canadian Patent Application No. 2,946,335; dated Aug. 28, 2017; 5 pages.
Canadian Office Action; Canadian Intellectual Property Office; Canadian Application No. 2,946,335; dated Jul. 13, 2018; 6 pages.
European Examination Report, European Patent Office, European Patent Application No. 15754880.1, dated Jun. 17, 2021, 3 pages.

* cited by examiner

ELECTRONIC LOCK WITH MOVABLE IN-LINE LOCKING LUG

CROSS-REFERENCE TO RELATED APPLICATIONS

The present application is a continuation of U.S. patent application Ser. No. 15/799,405 filed Oct. 31, 2017 and issued as U.S. Pat. No. 10,392,836, which is a continuation of U.S. patent application Ser. No. 15/156,703 filed on May 17, 2016 and issued as U.S. Pat. No. 9,834,959, which is a continuation of U.S. patent application Ser. No. 14/188,891 filed on Feb. 25, 2014 and issued as U.S. Pat. No. 9,340,998, the contents of each application hereby incorporated by reference in their entirety.

TECHNICAL FIELD

The present invention generally relates to an electronic lock, and more particularly, but not exclusively, to an electronic lock with a movable inline locking lug.

BACKGROUND

Lock assemblies are used to lock movable structural members such as doors, drawers, lids, and the like to prevent movement from fixed structural members. Many types of electronic locks have various shortcomings relative to certain applications. Accordingly, there remains a need for further contributions in this area of technology.

SUMMARY

One embodiment of the present invention is a unique electronic lock with a moveable axial inline locking lug. Other embodiments include apparatuses, systems, devices, hardware, methods, and combinations for an electronic lock. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
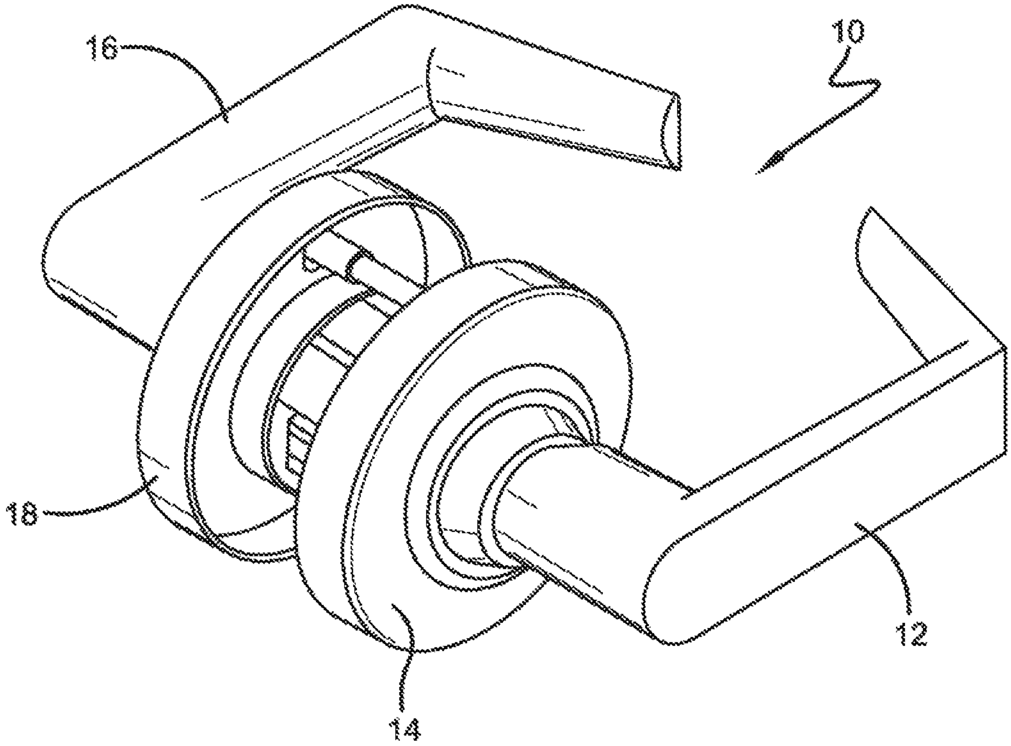
FIG. 1 is a perspective view of a lock apparatus with inside and outside lever handles connected thereto.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring now to FIG. 1, a lock apparatus assembly 10 is illustrated therein. The lock assembly 10 can include an inside lever handle 12 connected thereto and inside escutcheon plate 14 constructed to cover portions of the lock assembly 10. An outside lever handle 16 can similarly be connected to the lock assembly 10 and an outside escutcheon plate 18 can be positioned to cover a portion of the lock assembly 10. Although not shown, it should be understood that the lock assembly 10 is constructed to be connected to a movable structural member such as a door or the like. It should also be understood that material selection for each of the components in the lock apparatus assembly 10 can be defined by design requirements for a particular application. Materials can include but are not limited to metals, plastics, composites and combinations thereof.

Figure 2:
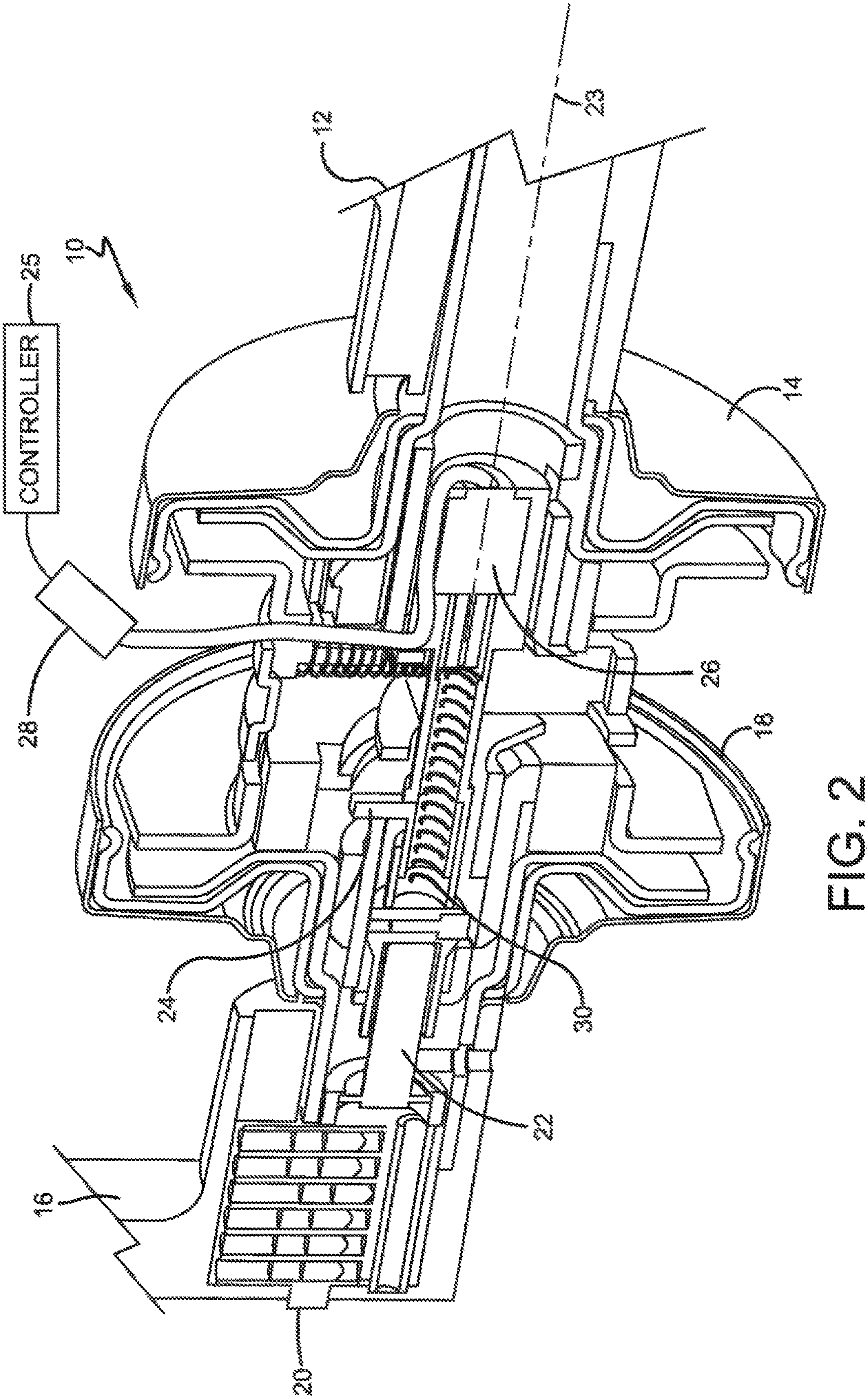
FIG. 2 is a perspective view of the lock apparatus of FIG. 1 partially cut away to show internal features.

Referring now to FIG. 2, the lock assembly 10 is shown partially cutaway so as to illustrate internal features within the assembly. The outside handle 16 (partially truncated) is connected to internal components of the lock assembly 10 that are illustrated, but will be discussed in more detail in subsequent figures. Likewise the inside handle 12 (also shown partially truncated) is connected to rotatable or pivotable components in the lock assembly 10. The inside escutcheon plate 14 and outside escutcheon plate 18 cover portions of the rotatable components within the lock assembly 10. A key cylinder 20 can be positioned proximate to the outside handle 16 and can be used to manually override an electronic lock system operable with the lock assembly 10. A key cam assembly 22 is operably connected to the key cylinder 20 at one end. The key cam assembly 22 is operable to actuate a locking latch (not shown) either through the manual override or when the lock assembly 10 is unlocked through electronic means.

A locking lug 24 can be moved in an axial direction along axis 23 between first and second positions corresponding to a locked and unlocked configuration of the lock assembly 10. The locking lug 24 can be moved between the first and second positions by a resilient member such as a coil spring 30 that is operably connected to an electric actuator 26. The electric actuator 26 can be an electric motor to impart to rotation motion into the coil spring 30 or alternatively, the electric actuator can be of a solenoid type that moves inline in an axial or linear fashion. An electronic controller 25 can be connected through the electric lead 28 so as to provide electronic commands to the electric motor 26 as will be described in more detail below. The electronic controller 25 can be programmable to accept various codes from an electronic keypad or discreet RF signals from a user's electronic credentials such as a security badge or the like. Various forms of electronic credentials can be used with the controller 25 such as proximity badges as well as swipe cards with magnetic strips and the like. The electric actuator 26 can be driven by DC or AC electric power sources as defined by requirements of a particular application.

Figure 3:
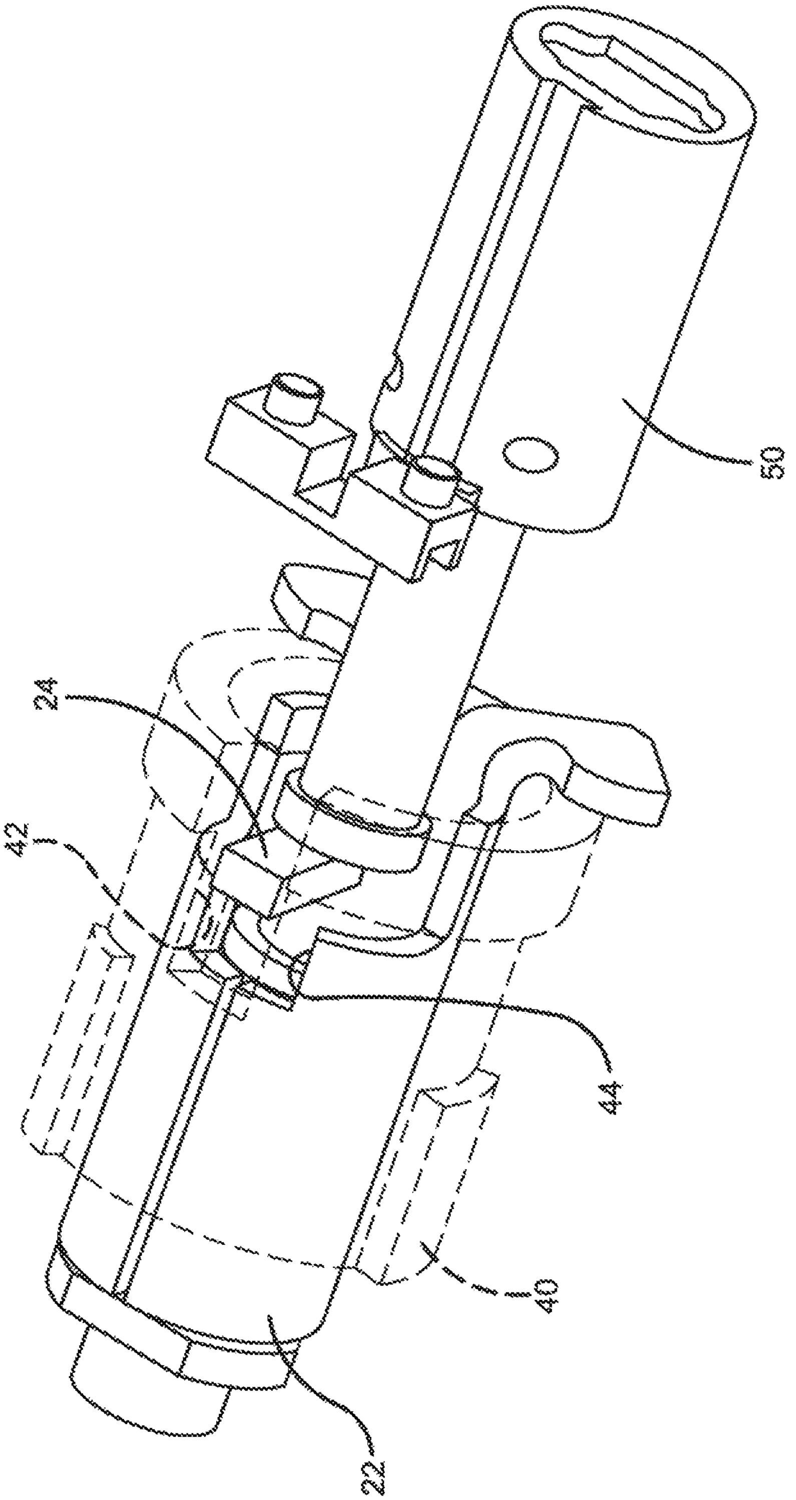
FIG. 3 is a perspective view of a motor housing and key cam assembly with a locking lug positioned in a locked configuration.

Referring now to FIG. 3, a lever spindle 40, partially illustrated in phantom lines for clarity, can be positioned circumferentially about the key cam assembly 22. The lever spindle 40 is rotatably connected to the locking lug 24 through a receiving slot 42 formed in the lever spindle 40. The locking lug 24 is slidable in an axial direction between first and second positions within a slot 42 formed in a wall of the lever spindle 40, but remains rotatably coupled in either position such that when the lever spindle 40 is rotated in either a clockwise or counter-clockwise direction the locking lug 24 will also rotate in the same direction. When the locking lug is in the first position as shown in FIGS. 3 and 4, the lock assembly 10 is in a locked configuration.

The key cam assembly 22 includes a receiving slot 44 formed in a key cam body 45 (see FIG. 4) that receives the locking lug 24 when the locking lug 24 is in the second position corresponding to an unlocked configuration. When the lock assembly 10 is unlocked the locking lug 24 will slide within the slot 42 of the spindle 40 to the second position and engage within the receiving slot 44 of the key cam assembly 22 as will be described with respect to FIGS. 5 and 6 below. When the locking lug 24 is in the first position the locking lug 24 is not coupled with the key cam assembly 22 and therefore rotation of the lever spindle 40 will not actuate rotation of the key cam assembly 22 or the locking latch (not shown). Also, a motor housing 50 for housing the electric actuator 26 is configured to permit operable connection between the locking lug 24 and the electric actuator 26.

Figure 4:
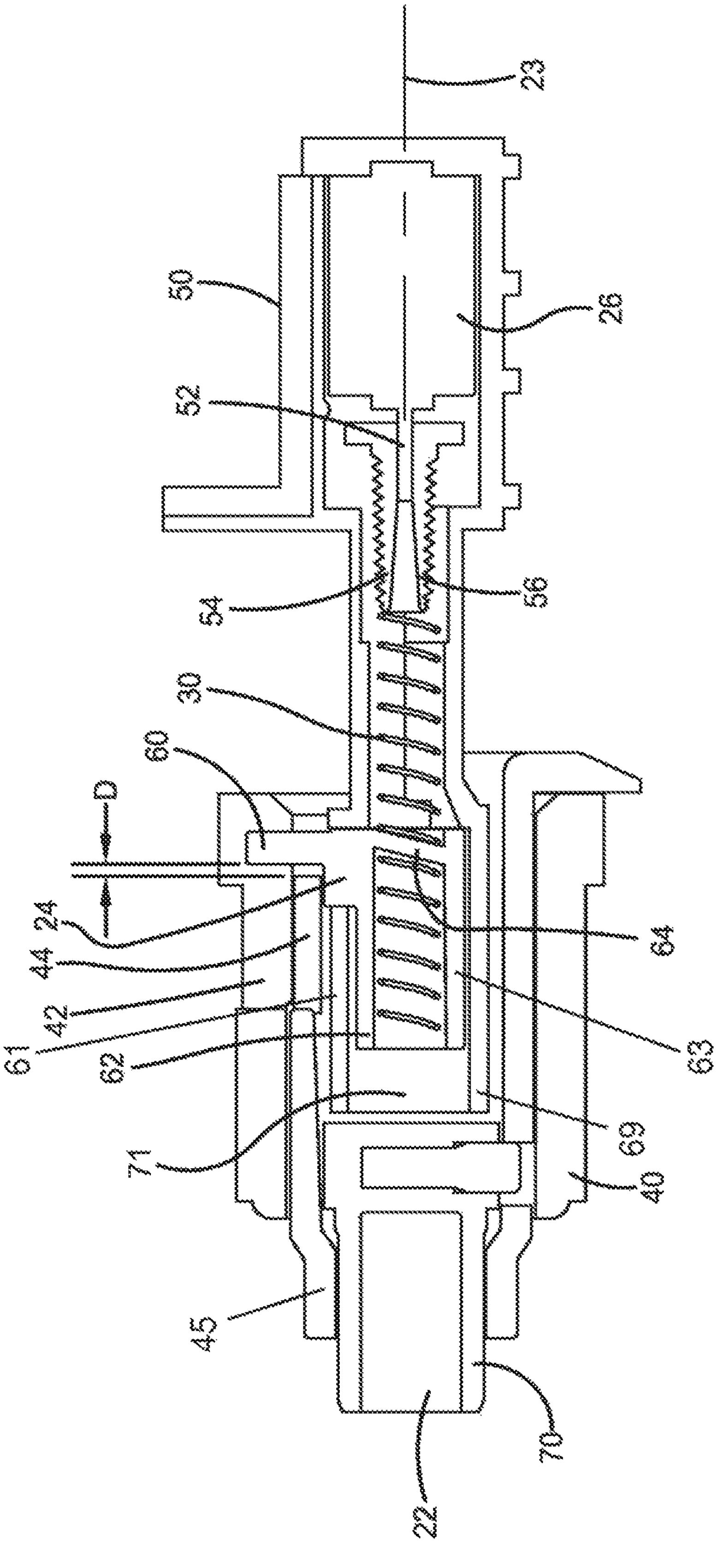
FIG. 4 is a side cutaway view of FIG. 3 showing the locking lug positioned in a locked configuration.

Referring now to FIG. 4, the motor housing 50 is constructed to hold the electric actuator 26 such as an electric motor 26 there within. The electric motor 26 can include a rotatable shaft 52 extending from one end of the electric motor 26. A spring coupler 54 can be connected to the rotatable shaft such that as the shaft 52 rotates, the coupler 54 will also rotate. The spring coupler 54 can include a plurality of knurls or ridges 56 extending radially outward from an axial center line 23. In one form, a resilient member such as a spring 30 can be operably attached to the outer surface of the spring coupler 54 and held with the respect to the spring coupler with the ridges 56. In other forms, the spring 30 can be operably connected to the electric motor 26 through other means as would be known to one skilled in the art.

The locking lug 24 can include a locking tab 60 that extends radially outward from a hollow cylindrical body 62. The locking tab 60 is constructed to move between first and second positions corresponding to a disengaged position and an engaged position relative to the receiving slot 44 of the key cam assembly 22, respectively. A drive tab 64 can be formed to extend radially inward from the hollow cylindrical body 62. The drive tab 64 is configured to engage with the spring 30 so as to impart a moving force from the spring 30 into the locking lug 24. The spring 30 can extend into the hollow cylindrical body 62 of the locking lug 24 and engage with the drive tab 64 such that the spring 30 can move the locking lug 24 between the first and second axial positions. In this exemplary embodiment the electronic actuator 26 is an electric motor that rotates the rotatable shaft 62 which in turn rotates the spring coupler 54 and the spring 30. The electric motor 26 is operable to move in first and second opposite rotational directions. In one form, the spring 30 can act in similar fashion as a screw drive such that as the spring 30 rotates the drive tab 64 follows the path of the rotating spring 30. Alternate embodiments for actuation are also contemplated by this disclosure. In one non-limiting example, the electric actuator can be an electric solenoid mechanism operable to move a shaft axially between first and second positions along the axis 23. In this form, a resilient member such as the coil spring 30 can be used to "push or pull" the locking lug in an axial direction between first and second positions. Other forms of flexible resilient members can also be used to transmit a moving force from the electric actuator 26 to the locking lug 24.

The key cam assembly 22 includes a key cam shaft 70 rotatably disposed about a lug receiving portion 69 extending from the motor housing 50. The lug receiving portion 69 includes a hollow internal cavity 71 for the hollow cylindrical body 62 of the locking lug 24 to slidingly move therewithin. FIG. 4 shows that when the locking lug 24 is in first position an axial gap "D" is formed between the locking tab 60 of the locking lug 24 and the receiving slot 44 (best seen in FIG. 3) of the key cam assembly 22. In this configuration, the lock assembly 10 is in a locked orientation because as locking lug 24 is rotated with the lever spindle 40, the locking tab 60 is not engaged with the key cam receiving slot 44, therefore will not rotate the key cam assembly 22 and thus not open a locking latch (not shown) connected to the lock assembly 10.

Figure 5:
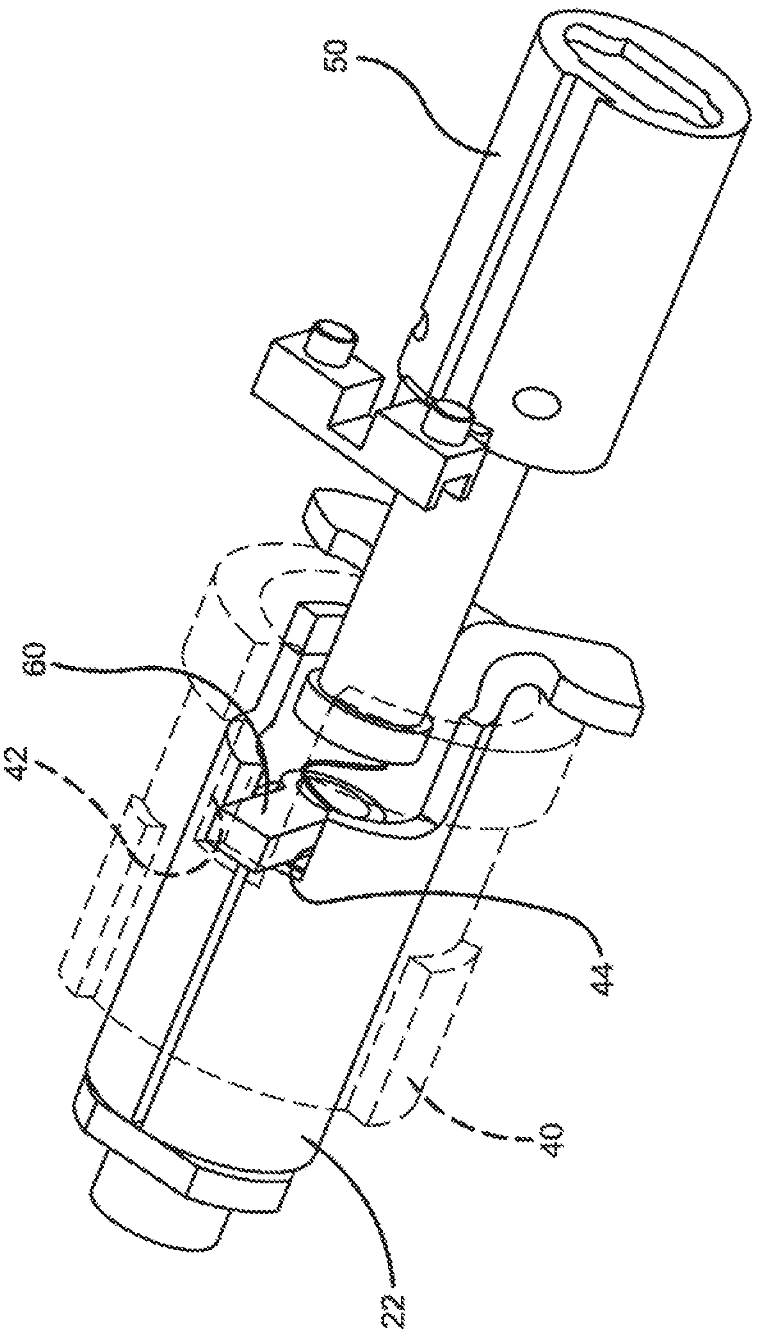
FIG. 5 is a perspective view of the motor housing and key cam assembly similar to that shown in FIG. 3 with the locking lug positioned in a unlocked configuration.

Referring now to FIG. 5, the locking lug 24 is in the second position and is engaged with the key cam receiving slot 44 which corresponds to the unlocked configuration. The locking tab 60 of the locking lug 24 is positioned to engage the key cam receiving slot 44 as it is moved along the spindle receiving slot 42. In this configuration the locking lug 24 will transmit rotational torque from the lever spindle 40 through the locking tab 60 such that the locking tab 60 will cause the key cam assembly 22 to rotate with the lever spindle 40 and thus open a locking latch (not shown) that is operably connected thereto.

Figure 6:
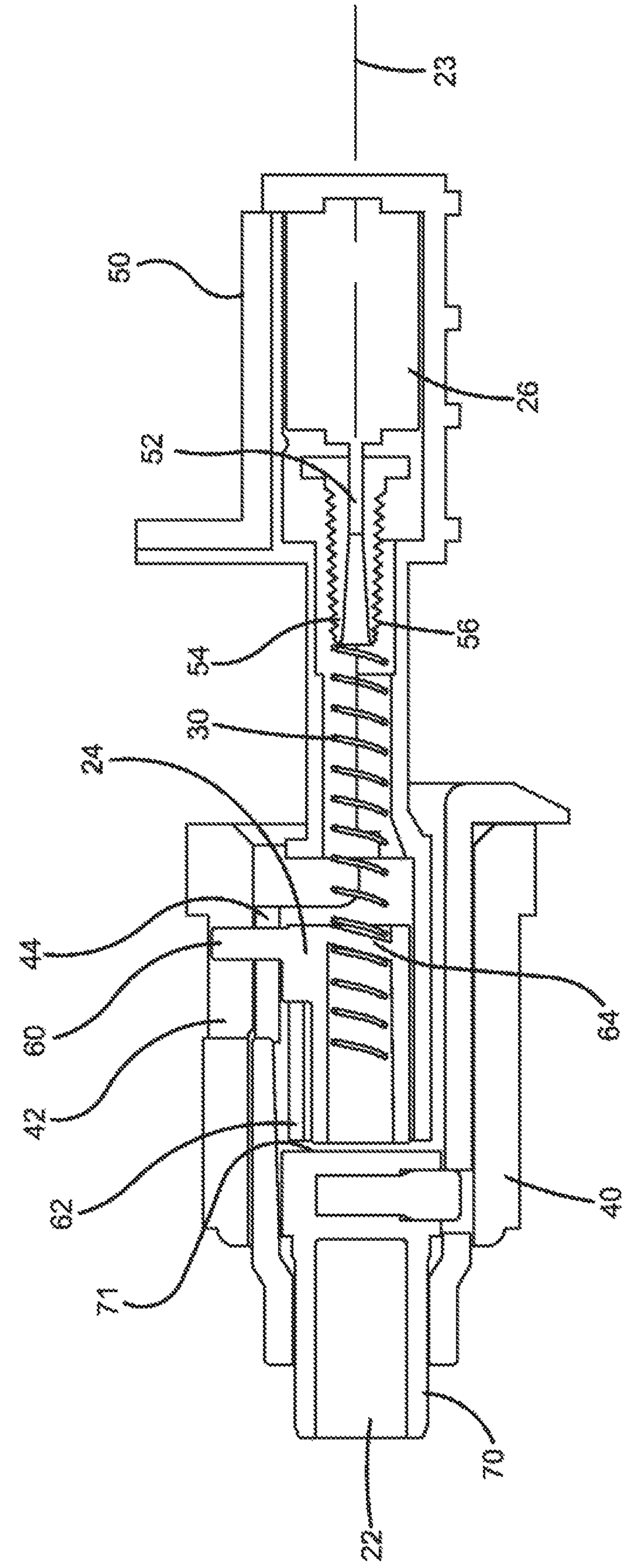
FIG. 6 is a side cutaway view of FIG. 5 showing the motor actuator and the locking lug positioned in a unlocked configuration.

Referring to FIG. 6, a side cutaway view of FIG. 6 is illustrated. Each of the components are identical to those shown in FIG. 4 except that the locking tab 60 has been moved to a second position which corresponds to the unlocked configuration. In this configuration the locking tab 60 is positioned within the key cam receiving slot 44 and will transmit rotational torque to the key cam assembly 22 when the lever spindle 40 is rotated by a lever 16.

One of the features of using a resilient spring 30 driven by an electric motor 26 is that if the lever spindle 40 is prematurely rotated prior to unlocking the lock assembly 10 (i.e. moving the locking lug 24 in an axial inline direction from a first position to a second position to engage the key cam receiving slot 44), the spring 30 will store the energy through spring compression. When the electric motor 26 imparts rotational or translational movement to the spring 30 when the slot 42 of the lever spindle 40 and slot 44 of the key cam assembly 22 are not circumferentially aligned, the locking lug 24 cannot move to the second position and the spring 30 will simply store the energy imparted thereto. When the lever handle 16 is released after having been rotated prematurely, the spindle 40 will rotate back to a neutral position, wherein spindle receiving slot 42, the key cam receiving slot 44 and the locking tab 60 will be in circumferential alignment and the stored energy in the spring 30 will cause the locking lug 24 to move into the engagement with the key cam receiving slot 44 to unlock the lock assembly 10.

Figure 7:
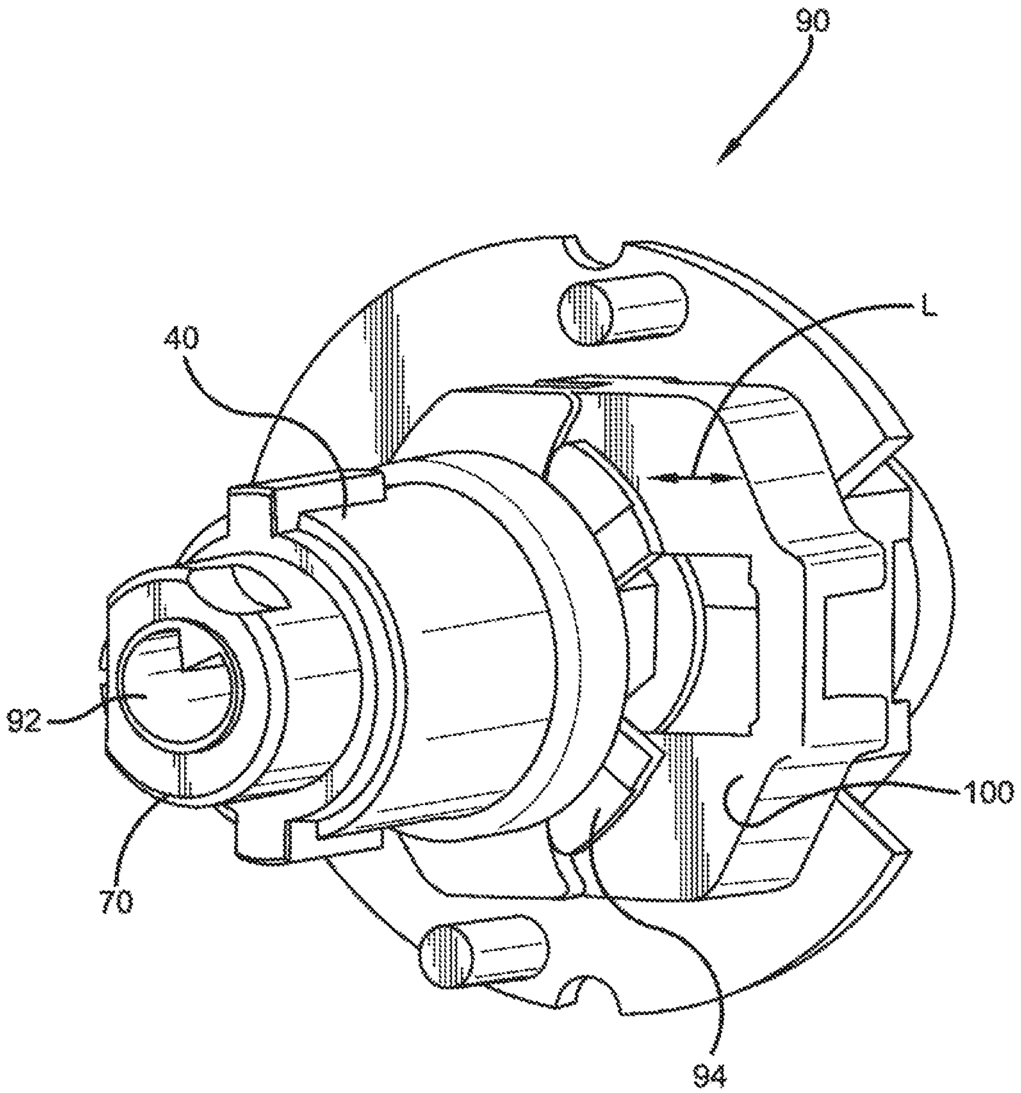
FIG. 7 is a perspective view of an outer hub assembly with manual override features.

Referring now to FIG. 7, a latch assembly 90 is constructed to open and close a latch (not shown) when the lock assembly is unlocked. The latch assembly 90 provides for an override function whereby a key can be used to open the latch assembly 90 without relying on the controller 25, electric actuator 26 and locking lug 24 to control the locked configuration of the lock assembly 10. The lever spindle 40 is configured to generally encompass the key cam shaft 70 and can independently rotate when the locking lug 24 is in the first or second positions (locked or unlocked) as was described previously. A drive bar receiving slot 92 is formed within the key cam shaft 70 and is constructed to receive a drive bar (not shown) which is operably connected to the key cylinder 20 (best seen in FIG. 2). The drive bar receiving slot 92 can be rotated with the drive bar when a key is used to unlock the lock assembly 10. Rotation of the key cam shaft 70 causes a key cam ear drive 94 to movably engage with a latch retractor 100. The latch retractor 100 is constructed to move in linear fashion along the path illustrated by double arrow "L." When the key cam shaft 70 is rotated with the drive bar the rotational motion of key cam ear drive 94 is transferred into linear motion of the latch retractor 100 such that a latch (not shown) can be engaged and or disengaged with a fixed structural member (also not shown). In this manner, the electronic lock mechanism can be manually overridden using a traditional key cylinder or the like.

In operation, electronic signals can be transmitted to and from an electronic controller 25 to either lock or unlock the lock assembly 10. The controller 25 can send electronic commands through the lead wires 28 to the electric actuator 26 to move a shaft that is connected to a resilient member 30 and drive the locking lug 24 between the first and second positions. The outside lever handle 16 can rotatingly actuate a lever spindle 40 when the locking tab 60 is in a first position (locked) or in a second position (unlocked). When the locking tab 60 is in the first position and not engaged with the key cam receiving slot 44, then the key cam assembly 22 cannot be rotatingly actuated with the outside handle because the lock assembly 10 is in a locked condition. When the electronic actuator 26 is activated to move the locking tab 60 of the locking lug 24 into the second position (unlocked) after the outside handle 16 has been prematurely rotated, the locking tab 60 cannot move into engagement with the key cam receiving slot 44 because of the circumferential misalignment between the slots of the lever spindle and key cam assembly, 42 and 44 respectively. The resilient member 30 will store energy from the electric actuator 26 until key cam receiving slot 44 becomes circumferentially aligned with the slot 42 of the lever spindle 40. After the outside handle 16 is released, the spindle receiving slot 42 will move into circumferential alignment with the key cam receiving slot 44 and spring energy from the spring 30 is released to move the locking tab 60 into the key cam receiving slot 44. When the locking tab 60 has slidingly moved into the key cam receiving slot 44, the locking tab will couple the key cam assembly 22 to the lever spindle 40 and rotation of the outside handle 16 will cause the latch to be retracted.

In one aspect, the present disclosure includes a lock apparatus comprising: a rotatable lever spindle at least partially disposed about a rotatable key cam assembly: a locking lug having a substantially hollow cylindrical body with a drive tab extending radially inward and a locking tab extending radially outward therefrom, the locking lug moveable between first and second axial positions corresponding to an uncoupled and coupled configuration respectively of the lever spindle and the key cam assembly; wherein the lever spindle is operable for transmitting rotational torque through the locking lug to the key cam assembly in the coupled configuration; an electric motor having a rotatable shaft extending therefrom; a coil spring connected to the rotatable shaft proximate one end and engaged with the locking lug proximate the other end; and wherein the electric motor is operable for moving the locking lug between the first and second positions with the coil spring.

In refining aspects, the present disclosure includes a lock apparatus wherein the coil spring extends through the hollow portion of the cylindrical body and is operably connected to the drive tab such that when the motor rotates in first or second opposite directions, the coil spring rotates to drive the locking lug between the first and second axial positions; wherein the locking tab is engaged within a slot formed in a wall of the key cam assembly when the locking lug is in the second position; wherein the locking tab is operable to transmit rotational torque from the lever spindle to the key cam assembly when the locking tab is engaged with the slot of the key cam assembly; wherein the locking tab will not couple with the key cam assembly when the locking tab and the slot of the key cam assembly are circumferentially misaligned; wherein the coil spring is operable to store energy when the electric motor rotates the coil spring and the locking tab is not circumferentially aligned with the slot of the key cam assembly; wherein stored energy in the coil spring moves the locking tab into engagement with the slot after the locking tab becomes aligned with the slot of the key cam assembly; a lever connected to the lever spindle; an electronic controller to control the electric motor; a manual override mechanism connected to the key cam assembly structured to permit a key to manually override the electronic controller; wherein the electronic controller is activated by electronic credentials; wherein the electronic credentials includes one of a code generated by an electronic key pad and an RF signal transmitted from an identification card or the like; at least one of an AC and a DC electric power source connected to the electric motor; and a latch assembly connected to the key cam assembly being operable to convert rotational motion of the key cam assembly to sliding motion of a slidable latch retractor.

Another aspect of the present disclosure includes a locking lug movable between locked and unlocked positions; a lever spindle connecting a hand actuated lever to the locking lug; a key cam assembly disposed at least partially within the lever spindle; wherein the unlocked position is defined by the locking lug being engaged with the key cam assembly and the locked position is defined by the locking lug being disengaged from the key cam assembly; wherein rotational torque from the lever spindle is transferred to the key cam assembly through the locking lug in the unlocked position; an electric actuator having a movable shaft; a drive member connected between the locking lug and the shaft of the actuator: and wherein the drive member transmits a moving force from the electric actuator to the locking lug in an axial direction between the locked and unlocked positions.

Refining aspects of the present disclosure include a lock apparatus wherein the drive member is resilient; wherein the drive member stores energy from the electric actuator when the locking lug is prevented from engaging with the key cam assembly; wherein the stored energy of the drive member is operable to move the locking lug into engagement with the key cam assembly when a locking tab extending from the locking lug becomes circumferentially aligned with a receiving slot formed in the key cam assembly; wherein the electric actuator is one of an electric solenoid actuator and an electric motor; a programmable electronic controller connected to the electronic actuator being operable to lock and unlock the lock apparatus.

Another aspect of the present disclosure includes a method comprising: connecting a lever spindle to a slidable locking lug having a locking tab extending radially outward, wherein the locking lug is rotatable with the lever spindle; positioning a key cam assembly at least partially within a portion of the lever spindle; selectively connecting the key cam assembly to the lever spindle when the locking tab is moved axially into a receiving slot formed in a wall of the key cam assembly; disconnecting the key cam assembly from the lever spindle when the locking tab is moved out of the receiving slot of the key cam assembly; and wherein a lock mechanism is locked and unlocked when the locking lug is disengaged and engaged, respectively with the receiving slot of the key cam assembly.

Refining aspects of the present disclosure includes: sliding the locking tab into and out of engagement with the slot of the key cam assembly with a resilient member connected to an electric actuator; and rotating the key cam assembly with a key operably connected therewith to manually override the electronic actuator and move a latch retractor between first and second positions.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A lock apparatus comprising:

a rotatable lever spindle at least partially disposed about a rotatable key cam assembly;

a locking lug having a substantially hollow cylindrical body with a drive tab extending radially inward and a locking tab extending radially outward therefrom, the locking lug moveable between first and second axial positions corresponding to an uncoupled and coupled configuration respectively of the lever spindle and the key cam assembly;

wherein the lever spindle is operable for transmitting rotational torque through the locking lug to the key cam assembly in the coupled configuration;

an electric motor having a rotatable shaft extending therefrom;

a coil spring connected to the rotatable shaft proximate one end and engaged with the locking lug proximate the other end; and wherein the electric motor is operable for moving the locking lug between the first and second positions with the coil spring.

2. The lock apparatus of claim 1, wherein the coil spring extends through the hollow portion of the cylindrical body and is operably connected to the drive tab such that when the motor rotates in first or second opposite directions, the coil spring rotates to drive the locking lug between the first and second axial positions.

3. The lock apparatus of claim 1, wherein the locking tab is engaged within a slot formed in a wall of the key cam assembly when the locking lug is in the second position.

4. The lock apparatus of claim 3, wherein the locking tab is operable to transmit rotational torque from the lever spindle to the key cam assembly when the locking tab is engaged with the slot of the key cam assembly.

5. The lock apparatus of claim 3, wherein the locking tab will not couple with the key cam assembly when the locking tab and the slot of the key cam assembly are circumferentially misaligned.

6. The lock apparatus of claim 3, wherein the coil spring is operable to store energy when the electric motor rotates the coil spring and the locking tab is not circumferentially aligned with the slot of the key cam assembly.

7. The lock apparatus of claim 6, wherein stored energy in the coil spring moves the locking tab into engagement with the slot after the locking tab becomes aligned with the slot of the key cam assembly.

8. The lock apparatus of claim 1, further comprising:

an electronic controller to control the electric motor; and a manual override mechanism connected to the key cam assembly structured to permit a key to manually override the electronic controller.

9. The lock apparatus of claim 1, wherein the coil spring extends into the hollow portion of the cylindrical body and is engaged with the drive tab.

10. A lock apparatus, comprising:

a lock lug moveable between a first position corresponding to an unlocked configuration and a second position corresponding to a locked configuration;

an electric actuator having a shaft extending therefrom, the electric actuator operable to move the shaft in a first direction and a second direction opposite the first direction; and a coupler having a first end portion and a second end portion opposite the first end portion, wherein the first end portion is coupled to the shaft for joint movement with the shaft in either the first direction or the second direction, and wherein the second end portion is engaged with the lock lug;

wherein the first end portion of the coupler is coupled with the shaft such that actuation of the electric actuator rotates the coupler;

wherein the coupler is structured to drive the lock lug toward the first position when the coupler is moved by the shaft in the first direction; and wherein the coupler structured to drive the lock lug toward the second position when the coupler is moved by the shaft in the second direction.

11. The lock apparatus of claim 10, wherein the coupler comprises a coil spring.

12. The lock apparatus of claim 11, wherein the lock lug comprises a drive member positioned between coils of the coil spring.

13. The lock apparatus of claim 10, further comprising a rotatable spindle;

wherein, with the lock lug in the first position, the spindle is operable to retract a latch; and wherein, with the lock lug in the second position, the spindle is inoperable to retract the latch.

14. The lock apparatus of claim 13, further comprising a key cam assembly engaged between the spindle and the latch;

wherein a portion of the key cam assembly is configured to retract the latch when rotated; wherein, with the lock lug in the unlocking position, the lock lug couples the portion of the key cam assembly with the spindle; and wherein, with the lock lug in the locking position, the portion of the key cam assembly is decoupled from the spindle.

15. The lock apparatus of claim 10, wherein movement of the shaft of the electric actuator in the first direction jointly moves the coupler in the first direction; and wherein movement of the shaft of the electric actuator in the second direction jointly moves the coupler in the second direction.

16. The lock apparatus of claim 10, wherein rotation of the coupler by the electronic actuator axially drives the lock lug between the first and second positions.

17. A lock apparatus, comprising:

a lock lug moveable between a first position corresponding to an unlocked configuration and a second position corresponding to a locked configuration;

an electric actuator having a shaft extending therefrom, the electric actuator operable to rotate the shaft in a first rotational direction and a second rotational direction opposite the first rotational direction; and a coupler having a first end portion and a second end portion opposite the first end portion, wherein the first end portion is coupled to the shaft such that rotational movement of the shaft in the first rotational direction correspondingly rotates the first end portion of the coupler in the first rotational direction, wherein rotational movement of the shaft in the second rotational direction correspondingly rotates the first end portion of the coupler in the second rotational direction, and wherein the second end portion of the coupler is engaged with the lock lug;

wherein the coupler is structured to drive the lock lug toward the first position when the coupler is rotated by the shaft in the first rotational direction; and wherein the coupler is structured to drive the lock lug toward the second position when the coupler is rotated by the shaft in the second rotational direction.

18. The lock apparatus of claim 17, wherein the coupler extends into an aperture formed in the lock lug.

19. The lock apparatus of claim 17, wherein the shaft of the electronic actuator is secured to the first end portion of the coupler such that the shaft and the coupler are displaced in the same direction upon actuation of the electronic actuator.

20. A lock apparatus, comprising:

a lock lug moveable between an unlocking position and a locking position, wherein the lock lug includes a hollow portion and a drive member positioned in the hollow portion;

an electric actuator comprising a movable shaft, wherein the electric actuator is operable to move the shaft in a first direction and a second direction opposite the first direction; and a coil spring having a first end portion and a second end portion opposite the first end portion, wherein the first end portion is engaged with the shaft, and wherein the second end portion extends into the hollow portion and engages the drive member;

wherein the coil spring is structured to drive the lock lug toward the unlocking position when the coil spring is moved by the shaft in the first direction; and wherein the coil spring structured to drive the lock lug toward the locking position when the coil spring is moved by the shaft in the second direction.

21. The lock apparatus of claim 20, further comprising a rotatable spindle;

wherein, with the lock lug in the unlocking position, the spindle is operable to retract a latch; and wherein, with the lock lug in the locking position, the spindle is inoperable to retract the latch.

22. The lock apparatus of claim 21, further comprising a key cam assembly engaged between the spindle and the latch;

wherein a portion of the key cam assembly is configured to retract the latch when rotated;

wherein, with the lock lug in the unlocking position, the lock lug couples the portion of the key cam assembly with the spindle; and wherein, with the lock lug in the locking position, the portion of the key cam assembly is decoupled from the spindle.

23. The lock apparatus of claim 20, wherein the first end portion is coupled with the shaft for joint movement with the shaft.

24. A lock apparatus, comprising:

a lock lug moveable between a first position corresponding to an unlocked configuration and a second position corresponding to a locked configuration;

an electric actuator having a shaft extending therefrom, the electric actuator operable to move the shaft in a first direction and a second direction opposite the first direction; and a coupler having a first end portion and a second end portion opposite the first end portion, wherein the first end portion is coupled to the shaft for joint movement with the shaft in either the first direction or the second direction, and wherein the second end portion is engaged with the lock lug;

wherein the lock lug includes a hollow portion and a drive member positioned in the hollow portion, and wherein the second end portion of the coupler extends into the hollow portion of the lock lug and engages the drive member;

wherein the coupler is structured to drive the lock lug toward the first position when the coupler is moved by the shaft in the first direction; and wherein the coupler structured to drive the lock lug toward the second position when the coupler is moved by the shaft in the second direction.

* * * * *